July 31, 1923.
W. E. HARMON
SHOCK ABSORBER
Filed Dec. 27, 1921
1,463,552
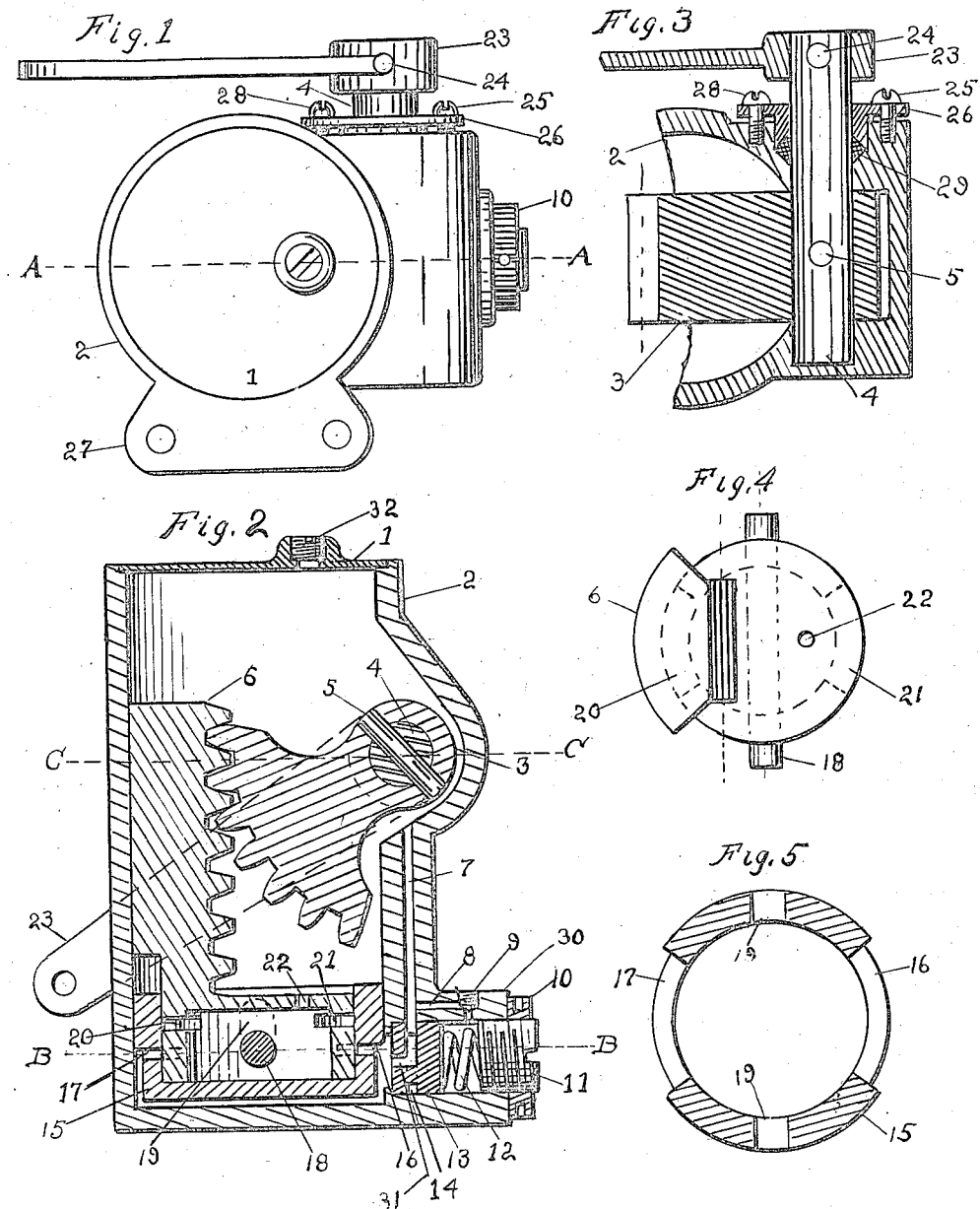
INVENTOR.
Willis E Harmon Patented July 31, 1923.

1,463,552

UNITED STATES PATENT OFFICE.

WILLIS E. HARMON, OF WORCESTER, MASSACHUSETTS.

SHOCK ABSORBER.

Application filed December 27, 1921. Serial No. 525,041.

*To all whom it may concern:*

Be it known that I, WILLIS E. HARMON, a citizen of the United States, residing at Worcester, in the county of Worcester and State of Massachusetts, have invented new and useful Improvements in Shock Absorbers, of which the following is a specification.

My invention relates to the class of shock absorbers for automobiles in which oil or some fluid is used to retard the movement of the automobile body away from the axle with the object of preventing a quick rebound of the automobile body.

I attain this object by the mechanism illustrated in the accompanying drawing, in which—

Figure 1 is a top view of the shock absorber assembled; Fig. 2 a vertical section on the line A A, Fig. 1; Fig. 3 a section on the line C C, Fig. 2, showing the packing box; Fig. 4 a top view of the hollow piston 6 and Fig. 5 a section through the inner cylinder on the line B B, Fig. 2.

Similar figures refer to similar parts throughout the several views.

My shock absorber which may be made of any suitable material comprises a fluid holding cylinder 2 with the flange 27 at the top by which it can be attached to the automobile chassis. A recess formed in the side wall accommodates the hub of the gear segment 3 and the thickened walls of the sides of the recess form the bearings for the shaft 4. On the side of the recess where the shaft 4 passes through its wall a packing box is arranged with the gland 26 adapted to compress the packing 29 by means of the screws 25 and 28. At the lower end of the fluid holding cylinder is a projection 30 which is bored to form a chamber for the automatic pressure equalizing device and leading from this chamber is a passageway 7 which opens into the said recess. Connecting this passageway 7 with the back end of the chamber in projection 30 is the port 8 with screw valve 9. The projection 30 is tapped to receive the screw plug 11 which is held in place by the check nut 10.

Lever 23 is adapted to connect with the automobile axle and transmit motion from it through the shaft 4 and gear segment 3 to the rack upon the hollow piston 6.

The hollow piston 6 has its upper end shaped to slide in contact with the inner surface of the fluid holding cylinder 2 so as to hold its rack in mesh with the gear segment 3. The lower end is slidably mounted within the inner cylinder 15 and is adapted to move the same with some lost motion. This lower end is hollowed out to form a chamber with ports 20 and 21 through its side wall and a vent 22 through its top wall.

The inner cylinder 15, which is closed at the bottom, is slidably mounted within the fluid holding cylinder 2. Its ports 16 and 17 communicate between the inside of the inner cylinder 15 and the lower or high pressure end of the fluid holding cylinder 2 when open. The lost motion between the hollow piston 6 and the inner cylinder 15, as limited by pin 18 in slot 19, is sufficient to allow the hollow piston 6 on its upper movement to withdraw from the inner cylinder 15 to open its ports 20 and 21 and the ports 16 and 17 through the wall of the inner cylinder 15 to permit fluid to flow freely therethrough. To prevent the lower end of the hollow piston 6 from striking the bottom of the inner cylinder 15 a sudden blow, when the hollow piston moves downward, the ports 16, 17, 20 and 21 are arranged to close when the hollow piston 6 has advanced part of its travel into the inner cylinder 15, for the balance of its travel it is retarded by the fluid confined within the chamber of the hollow piston 6 and the inner cylinder 15 which is allowed to escape slowly through the vent 22 in the wall of the hollow piston 6.

The automatic pressure equalizing device consists of a plunger 13 slidably mounted in the chamber of projection 30 with means for its control. This plunger has a groove 14 around it at right angles to its axis which normally registers with the passageway 7 and a port 31 which leads from this groove into the lower or high pressure end of the fluid holding cylinder 2. The plunger 13 is pressed to the limit of its travel in one direction within the chamber in projection 30 by spring 12. The tension is regulated by the screw plug 11 which is held in place by the check nut 10. To prevent movement of the plunger 13 due to sudden temporary changes of fluid pressure in the fluid holding cylinder 2, the fluid confined in the chamber in projection 30 back of the plunger is retarded in its flow by the screw valve 9 in port 8.

After the parts of the shock absorber are assembled, the fluid holding cylinder 2 is closed by soldering or by other means holding a light cover 1 in place at its top. This cover has a plug 32 screwed into it which can be removed for the purpose of filling. The operation of my shock absorber is as follows:—When the automobile to which it is attached strikes a projection in its path, its axle rises towards its body, this causes the lever 23 to raise the hollow piston 6, open its ports 20 and 21 and the ports 16 and 17 in the inner cylinder 15 and permit the fluid above the inner cylinder 15 in the fluid holding cylinder 2 to flow freely into the lower or high pressure end of the fluid holding cylinder 2 and upon continued movement of the hollow piston 6 the pin 18 made fast in it strikes the upper end of the slot 19 in the inner cylinder 15 and both hollow piston 6 and inner cylinder 2 move upward together with ports fully open until the automobile has passed over the projection.

When the automobile has passed over the projection its axle moves away from its body, the lever 23 moves downward, and transmits this movement through the shaft 4 and gear segment 3 to the hollow piston 6 to cause it to slide into the inner cylinder 15 and close the ports 16, 17, 20 and 21. Its movement is now retarded somewhat by the fluid confined between the hollow piston 6 and the inner cylinder 15, as this fluid escapes the hollow piston 6 slowly comes in contact with the bottom of the inner cylinder 15 and imparts motion thereto. The movement of both the inner cylinder 15 and hollow piston 6 downward is retarded by the fluid in the lower end of the fluid holding cylinder 2 which can escape only through the port 31 and groove 14 of the plunger 13 and passageway 7 into the upper part of the fluid holding cylinder 2. If the movement of the inner cylinder 15 is slight or slow the retarding effect is slight due to the large size of the port 31, groove 14 and passageway 7, but if the movement downward of the inner cylinder 15 is quick and continued the fluid is under greater pressure, this causes the plunger 13 to compress the spring 12 and partly close the passageway 7 to retard the flow of the fluid more and offer greater resistance to the movement of the inner cylinder 15 and stop such movement quickly thus preventing the rebound of the automobile body to which the fluid containing cylinder 2 is attached.

What I claim is:

1. A shock absorber comprising; a fluid holding cylinder, means including an inner cylinder with a hollow piston therein adapted to transmit motion thereto from an external source and allow the fluid to flow freely through the inner cylinder when it is moved in one direction and retard fluid passing when moved in the opposite direction and means automatically acted upon prolonged fluid pressure to restrict the equalization of fluid pressure on both sides of the inner cylinder in proportion to said fluid pressure.

2. A shock absorber comprising; a fluid holding cylinder, an inner cylinder closed at one end and having a hollow piston adapted to travel a limited distance therein and then impart motion thereto, ports through the side wall of both inner cylinder and hollow piston, means outside of the fluid holding cylinder operatively connected with the hollow piston whereby it and the inner cylinder can be moved in one direction with the ports open and in the opposite direction with the ports closed and means independent of said ports for regulating the equalization of fluid pressure on both sides of the inner cylinder.

3. A shock absorber comprising; a fluid holding cylinder, an inner cylinder closed at one end and having a hollow piston adapted to travel a limited distance therein and impart motion thereto, ports through the side wall of both inner cylinder and hollow piston and means to check the movement of the hollow piston into the inner cylinder after it has closed the ports including a vent through the closed end of the hollow piston through which the fluid confined therein can escape slowly.

4. In a shock absorber, a fluid holding cylinder, an inner cylinder closed at one end, a hollow piston adapted to travel a limited distance therein and then impart motion thereto, ports through the side wall of both inner cylinder and hollow piston adapted to open when the hollow piston is moved in one direction and close upon movement in the opposite direction, means for regulating the equalization of fluid pressure on both ends of the inner cylinder when the said ports are closed including a passageway communicating between both sides of the liquid holding cylinder, a chamber in said passageway and a plunger therein adapted to restrict the flow of fluid into said passageway in proportion to the fluid pressure.

5. A shock absorber comprising; a fluid holding cylinder, an inner cylinder with ports through its side wall, a piston adapted to open or close said ports and impart motion to said inner cylinder, means for regulating the equalization of the fluid pressure on both sides of the inner cylinder including a chamber opening into the lower or high pressure end of the fluid holding cylinder, a passageway communicating between said chamber and the upper or low pressure end of the fluid holding cylinder, a plunger slidably mounted in said chamber adapted to restrict the flow of fluid into said passageway as governed by the fluid pressure in the high pressure end of the fluid holding cylinder and means to prevent the sudden movement of said plunger, including a port communicating between said passageway and said chamber back of the plunger through which the fluid can enter and leave slowly.

6. A shock absorber comprising; a fluid holding cylinder, an inner cylinder with ports through its wall, a hollow piston adapted to move a limited distance therein and open or close said ports, means for moving the hollow piston including a rack attached thereto, a gear segment in engagement with said rack, a lever outside of the fluid holding cylinder operatively connected with the gear segment and means for regulating the equalization of fluid pressure on both sides of the inner cylinder when said ports are closed.

7. A shock absorber comprising; a fluid holding cylinder containing shock absorbing mechanism with a regulating device for controlling the equalization of fluid pressure on both sides of said shock absorbing mechanism including; a chamber, a plunger having a groove around it at right angles to its axis slidably mounted in said chamber, a port connecting the groove with the high pressure side of the shock absorbing mechanism, a passageway which under low fluid pressure conditions registers with the groove and communicates with the low pressure side of the shock absorbing mechanism and a spring with means for adjustment to govern the movement of the plunger to restrict the flow of fluid through the passageway when the fluid pressure rises on the high pressure side of the shock absorbing mechanism.

WILLIS E. HARMON

Witnesses:
 MARGARET M. HILTON,
 FRANCIS P. McKEON.